UNITED STATES PATENT OFFICE.

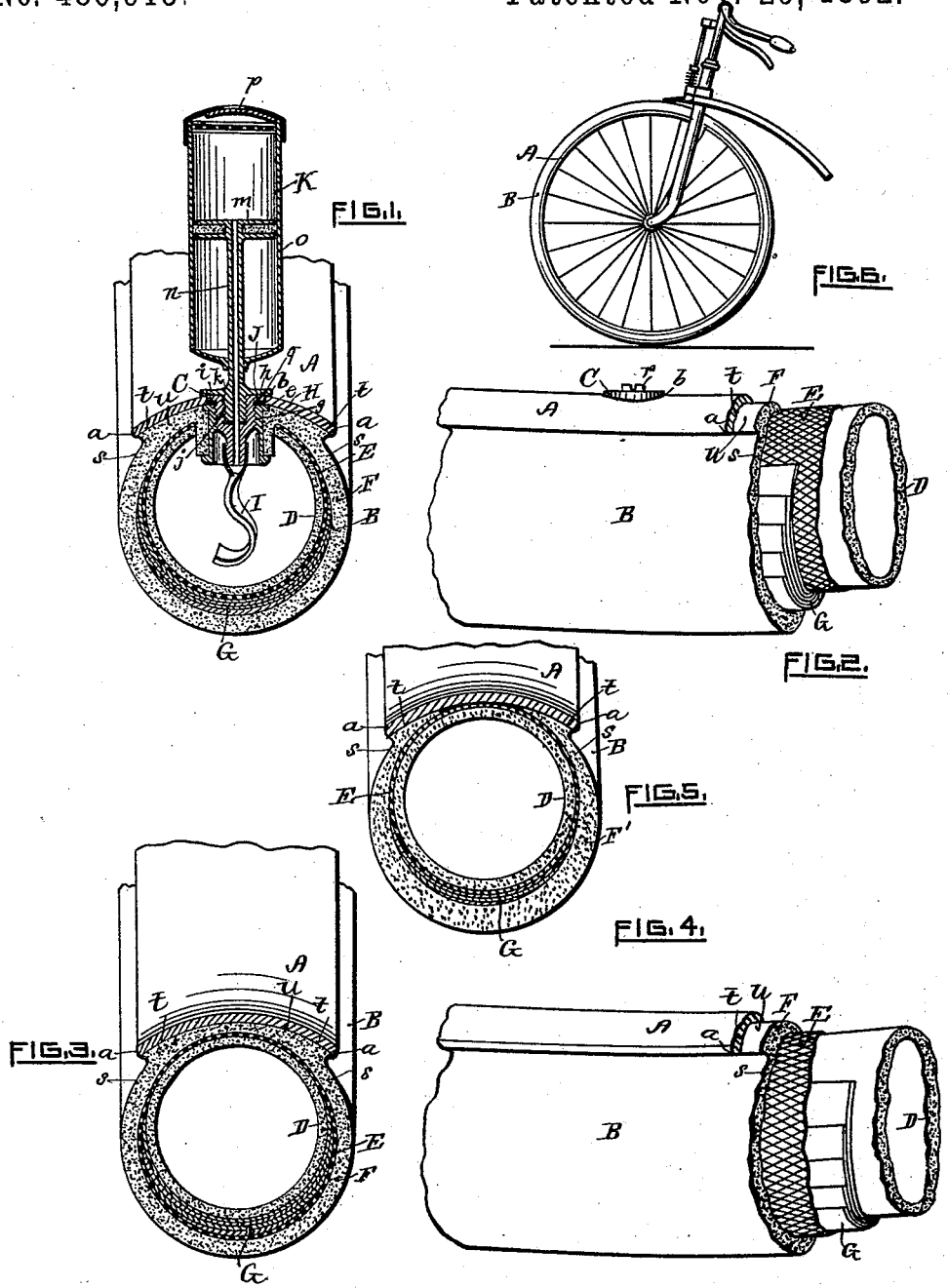

PARDON W. TILLINGHAST, OF PROVIDENCE, RHODE ISLAND.

PNEUMATIC TIRE.

SPECIFICATION forming part of Letters Patent No. 486,915, dated November 29, 1892.

Application filed June 20, 1892. Serial No. 437,375. (No model.)

*To all whom it may concern:*

Be it known that I, PARDON W. TILLINGHAST, a citizen of the United States, residing at Providence, in the State of Rhode Island, have invented a new and useful Improvement in Pneumatic Tires and Means for Inflating the Same, of which the following is a specification.

The nature of my invention consists in the improved construction of the tire, whereby the desired flexibility and impenetrability are secured, and in the improved combination of the valve with the rim of the wheel, whereby the tire and valve will be protected from the loosening action of the inflating-pump, as hereinafter set forth.

Figure 1 represents a transverse section of the tire and the rim of the wheel, also showing the valve and the attached pump in section. Fig. 2 represents a side view of a portion of the tire and rim, showing the internal construction of the tire. Fig. 3 represents a transverse section of the rim of the wheel and the tire, showing a modification in the combination of the parts of the tire. Fig. 4 represents a side view of a portion of the tire and rim as shown in Fig. 3, the tire being broken away at the end to show its construction. Fig. 5 represents a transverse section showing a modification. Fig. 6 represents a side view of a steering-wheel provided with an annular pneumatic tire having all its parts vulcanized together to carry out my invention.

In the accompanying drawings, A represents the rim of the wheel, which is made in slightly-hollowed form and provided with a perforation $b$, adapted to receive the valve-tube C of the tire B. The hollow annular tire B, as shown in Figs. 1 and 2, is composed of an annular inner rubber tube D, which is provided with a circularly braided or woven covering E, adapted to prevent the bursting of the tube D when subjected to pressure, and outside of the covered tube D is placed the rubber tube F, the annular periphery of which forms the tread of the tire, and between the tube F and the tube D are placed the layers of canvas G, which serve to prevent the puncture of the inner tube by sharp or pointed objects encountered in the road, the several parts of the tire being placed together, as described, and then vulcanized, so that the several parts will become attached to each other by the process of vulcanization, and instead of placing the layers of canvas G at the outer side of the braided or woven covering the same can be arranged at the inner side of the same, as shown in Figs. 3 and 4.

Heretofore pneumatic tires have been constructed with an inner air-tube of vulcanized rubber, provided with a covering of canvas, and a separately-vulcanized outer rubber covering; but the separately-formed parts are liable to chafing and rapid wear by rubbing contact with each other; but with my improved tire, as above described, the parts of which are all vulcanized together, the outer and inner rubber tubes are so attached to each other that the chafing action between the several parts of the tire will be prevented and a durable non-penetrable tire will be produced. The outer rubber covering F is preferably made thicker at the edges $a$ $a$ of the rim A than at its side walls $s$ $s$ and the outer surface of the rubber covering extends from the edges $a$ $a$ at an angle with the attaching surface $t$ of the rim, the attaching portion $u$ of the tire being thus made of a width which is practically equal to the width of the rim, and by reason of the angular construction of the tire at the sides of the attaching portion, which sides coincide with the bearing-edges of the rim, the deleterious chafing of the tire against the edges of the rim will be prevented, the liability of chafing the tire at this point having heretofore caused serious trouble in all inflated pneumatic tires which are held in the groove of the rim, and in pneumatic tires heretofore constructed to be inflated by means of a detachable hand-pump the said pump has been screwed to the metallic valve-tube of the tire under such conditions that the yielding material of the tire must resist the thrusting or pulling action of the pump, which soon causes the loosening and derangement of the valve-tube from its attachment to the wall of the rubber tire, thus causing a leak, which is extremely hard to repair, and this defect is avoided in my invention by providing the inserted metal tube H with the flange $e$, which is made of greater diameter than the diameter of the perforation $b$, made in the rim A of the wheel, the said tube H being provided with a screw-thread $g$, adapted to receive the screw-threaded valve-tube C, which is provided at its lower end with the collapsible tube I. The valve-tube C is provided with a flange $h$, made of less diameter than the diameter of the perforation $b$ in the rim A, and between the inner side of the flange $h$ and the outer end of the tube H is placed the packing-ring $i$, the annular valve J so formed, when unscrewed from its seat, serving to relieve the pressure of air in the tire, the air being allowed to escape slowly between the loosely-fitting screw-threads of the tubes C and H and being prevented from escape when the tire is inflated by means of the packing-ring $i$. The valve-tube C is also provided with the screw-threaded cavity $j$, which is adapted to receive the corresponding thread of the attaching-screw $k$ of the hand-pump K, which consists, essentially, of the piston $m$ and hollow piston-rod $n$, the barrel $o$, and the inlet-valve $p$, the hollow piston-rod $n$ being provided with a flange $q$, which, being of greater diameter than the perforation $b$ in the rim A, will when screwed to the tube H find a bearing-seat against the inner side of the rim A, so that the rim A will be tightly embraced between the flange $q$ of the piston-rod $n$ and the flange $e$ or end of the tube H, thus holding the pump K firmly to the rim and preventing the thrusting or pulling effect upon the rubber tire and valve during the process of inflation.

When the pump is removed from the cavity $j$, the said cavity may be closed by means of the screw $r$, which will serve to prevent the entrance of sand or dust into the valve-tube C.

In the modification shown in Fig. 5 the outer covering F' does not form a complete tube, but only partially encircles the inner tube D.

I claim as my invention—

1. The combination, with the rim of the wheel, of a hollow inflatable tire having its attaching portion practically of the same width as that of the rim and having the edges of the said attaching portion made thicker than the adjacent side walls of the tire, whereby the chafing of the tire at the edge of the rim will be prevented, substantially as described.

2. The combination, with the rim of the wheel, of a hollow inflatable tire having the outer surface of its side walls adjacent to the attaching portion extending outward at an angle with the attaching surface of the rim, whereby the chafing of the tire at the edge of the rim will be prevented, substantially as described.

3. The combination, with the rim of the wheel, provided with an opening for the valve-tube, and a pneumatic tire having an internally-screw-threaded attaching tube of greater exterior diameter than the said opening in the tire, and a valve-tube adapted to pass through the said opening in the rim and screw into the attaching tube, of a pump for inflating the tire, said pump having a flange at its attaching end of larger diameter than the opening in the rim, whereby when the pump is screwed to the valve-tube the said pump will be firmly clamped to the rim, substantially as described.

PARDON W. TILLINGHAST.

Witnesses:
S. SCHOLFIELD,
JAMES W. BEAMAN.